(12) United States Patent
Yik et al.

(10) Patent No.: US 6,697,873 B1
(45) Date of Patent: Feb. 24, 2004

(54) HIGH SPEED MAC ADDRESS SEARCH ENGINE

(75) Inventors: James Yik, Irvine, CA (US); Linghsiao Wang, Irvine, CA (US)

(73) Assignee: Zarlink Semiconductor V.N., Inc., Irvine, CA (US)

( * ) Notice: Subject to any disclaimer, the term of this patent is extended or adjusted under 35 U.S.C. 154(b) by 708 days.

(21) Appl. No.: 09/643,567

(22) Filed: Aug. 22, 2000

Related U.S. Application Data (60) Provisional application No. 60/172,987, filed on Dec. 20, 1999.

(51) Int. Cl.[7] .............................................. G06F 13/00
(52) U.S. Cl. ...................... 709/238; 709/245; 709/247; 370/395.32
(58) Field of Search ................................. 709/238, 245, 709/247, 249, 250; 707/3, 6; 370/389, 392, 395.31, 395.32

(56) References Cited

U.S. PATENT DOCUMENTS

| | | | |
|---|---|---|---|
| 5,740,171 A | * | 4/1998 | Mazzola et al. ............ 370/392 |
| 5,917,821 A | * | 6/1999 | Gobuyan et al. ........... 370/392 |
| 6,009,423 A | | 12/1999 | Moran |
| 6,192,051 B1 | * | 2/2001 | Lipman et al. ............. 370/389 |
| 6,295,299 B1 | * | 9/2001 | Haddock et al. ............ 370/423 |

\* cited by examiner

*Primary Examiner*—Viet D. Vu
(74) *Attorney, Agent, or Firm*—Tucker Ellis & West LLP (57) ABSTRACT

Disclosed is an apparatus and method for storing and searching computer node addresses in a computer network system. In one embodiment, the apparatus comprises a frame forwarding device such as a switch. The switch includes two MAC address tables including a primary MAC address table and secondary MAC address table both for storing and searching MAC addresses. The primary table stores records that contain compressed values of MAC addresses. The records are contained in storage locations that are referenced using the compressed value of the MAC address as a search index. In order to account for searching collisions that may result from different MAC addresses compressing to the same value, each record in the primary address table is linked to a chain of records in the secondary table. The records in the secondary table store the full value of the MAC address. Each chain of records in the secondary address table contains MAC addresses the present invention.

21 Claims, 11 Drawing Sheets

| Secondary MAC Address Table 220b | | | |
|---|---|---|---|
| | MAC Address | Port | Hash Family Link |
| 1 | A | | 2 — 330a |
| 2 | B | | 3 — 330b |
| 3 | C | | null — 330c |
| 4 | D | | 5 — 330d |
| 5 | E | | null — 330e |
| 6 | F | | 7 — 330f |
| 7 | G | | null — 330g |

| Primary MAC Address Table 220a | | | |
|---|---|---|---|
| | MAC Address | Port | Hash Family Link |
| 305a | 100 | | 1 |
| 305b | 200 | | 4 |
| 305c | 300 | | 6 |
| 305d | 400 | | null |
| | | | |
| | | | |
| | | | |

HIGH SPEED MAC ADDRESS SEARCH ENGINE

This application claims the benefit of U.S. Provisional application Ser. No. 60/172,987, filed Dec. 20, 1998.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to computer network technology. More particularly, the present invention relates to searching and forwarding of frames and computer addresses in a computer network.

2. Description of Related Art

A computer network generally comprises a set of conjoined computer devices that are communicatively linked so as to share resources such as storage devices, peripherals, applications, output devices, etc. The computing devices in a local area network (LAN) are typically connected to each other directly by cable connections. For organizational reasons, several devices in a network may be connected at a central connection point referred to herein as a hub. A hub typically has a plurality of ports that are each communicatively linked to one or more devices, such as a node, a switch, or a repeater. As used herein, the term "node" refers to any device that can communicate with other computers in a network. The hub receives an incoming signal from a source node through one port and sends the incoming signal out to a destination node through one or more other ports.

A repeater is a very simple form of a hub. Repeaters extend the size of a network by joining multiple segments into a larger segment. Repeaters increase a network signal's strength so the signal can be transmitted and received over a greater distance without a loss in quality. For example, the signal may have become degraded due to the distance traveled from the source to the repeater over the cable. The repeater regenerates the weak signal internally and forwards the signal out through all ports. This means that a repeater does not process data at all, but rather merely receives incoming signals and reconditions them for immediate transmission on all ports (except the originating port). That is, the repeater does not perform any analysis as to the destination address of the signal, but rather blindly sends the signal out through all is ports.

A repeater can significantly increase the traffic level of a network because the repeater outputs all incoming signals through every port. This may not present a problem in networks where communication traffic is relatively low. However, in networks where traffic volume is relatively high, small increases in communication traffic may significantly degrade the performance of the network.

Switches and bridges are more complex types of hubs that overcome the aforementioned drawbacks associated with repeaters. Unlike repeaters, switches and bridges include frame forwarding logic and perform basic signal filtering functions before transmitting an incoming signal. Whereas repeaters forward all signals through every port, switches and bridges only forward signals that are necessary and only forward the signals to the appropriate port based upon the destination address of the signal.

In relation to the Ethernet network standard, signals are transmitted through the network as frames of data that travel from the source node to the destination node. A frame is generally comprised of several fields of information, including two fields that denote the destination Media Access Control (MAC) address and the source MAC address for the frame. The source MAC address specifies the source node of the frame and the destination MAC address specifies the destination node of the frame. Each node in the network is identified by a unique MAC address, which comprises a 48 bit (6 byte) string. Six bytes of device ID allows for approximately 32 trillion ($2^{48}$) possible unique MAC addresses.

When a switch or a bridge receives an incoming frame, the switch or bridge examines the frame's destination address. The switch maintains in internal memory a database of past frames. Through use of the database, referred to herein as an address table, the switch can keep track of which MAC addresses correspond to which ports on the switch. Upon receipt of a frame, the switch references the database and determines the port that is associated with the particular MAC address. The switch then forwards the frame to the correct port. Essentially, the switch checks its internal memory of past frames and determines whether to forward the frame to another port or to filter out the frame.

The speed at which a switch can forward a frame to the correct port is dependent on several factors, including the amount of time that it takes for the frame to search its address table, find the frame's destination address and output the frame through the correct port(s). Ideally, an address table would contain enough data space to store each and every possible 6 byte MAC address. In such a case, the address table could contain an array of entries comprised of a complete listing of every single possible address and the port corresponding to each address. Upon receipt of a MAC address, the switch could then quickly search through the table and identify the appropriate port to which the MAC address should be forwarded.

However, as mentioned, there are approximately 32 trillion ($2^{48}$) possible MAC addresses that would have to be stored in such a table. In the real world, it would not be practical from a cost standpoint to maintain sufficient memory to store a table that contains each and every possible six byte MAC address. One way of reducing the amount of memory required for an address table would be to store a compressed or hashed version of the address in the table. However, this could result in collisions during searching as one or more different addresses could map to the same hash value.

Consequently, there is a need for a fast and efficient method of maintaining computer address forwarding tables.

SUMMARY OF THE INVENTION

Disclosed is an apparatus and method for storing and searching computer node addresses in a computer network system. The system is described in the exemplary context of storing and searching MAC addresses in an Ethernet system. The system comprises a frame forwarding device such as a switch. The switch includes two MAC address tables including a primary MAC address table and secondary MAC address table both for storing and searching MAC addresses.

The primary MAC address table is preferably stored in a memory that is external to the switch and the secondary MAC address table is preferably stored in a memory that is internal to the switch. The primary table is preferably sensitive in data entry size according to the bus width of the external memory and may have a slower access speed and larger size than the secondary table. In order to increase the searching speed of the secondary address table, a search module is configured to perform on a bandwidth that is optimized to the memory in which the secondary address table is stored.

In one aspect of the invention, the primary address table stores records that contain MAC addresses. The records are contained in storage locations that are referenced using a compressed or hashed value of the MAC address as a search index. In order to account for searching collisions that may result from different MAC addresses hashing to the same value, each record in the primary address table may be linked to a hash family of chain of records in the secondary table. Each hash family chain of records in the secondary address table contains MAC addresses that belong to the same hash family, or MAC addresses that compress to the same value.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
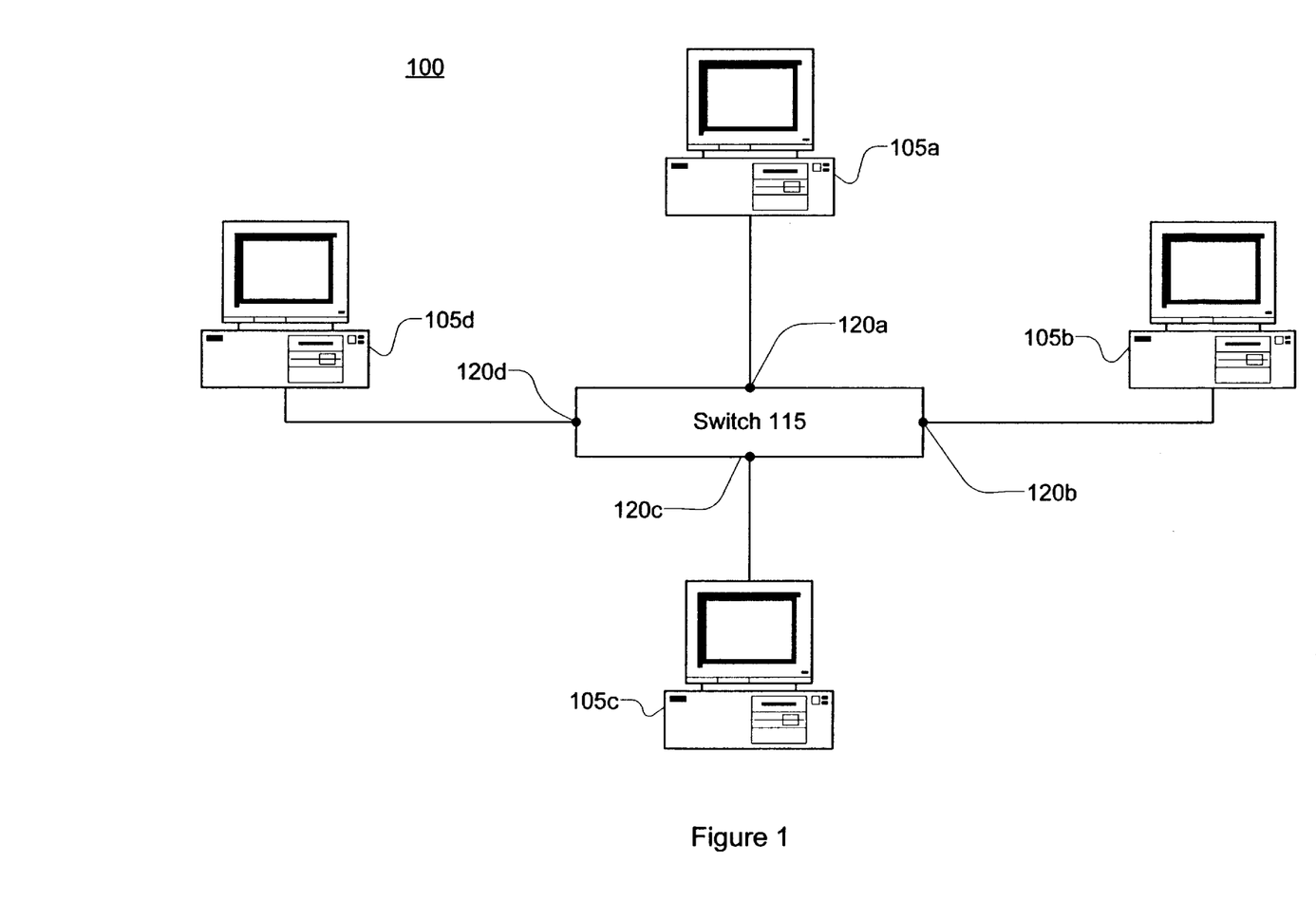
FIG. 1 is a schematic illustration of a network system.

FIG. 1 schematically illustrates a local area network (LAN) 100 that includes a plurality of computer nodes. The computer nodes are referred to collectively using the reference numeral 105 and individually using the reference numeral 105 followed by a letter suffix. Additional devices, such as printers, scanner, copiers, and other devices, such as multifunction peripherals (MFPs) and fax devices, may also be coupled to the LAN 100. The LAN 100 is described herein in the context of an Ethernet network topology, although the principles described herein could also be applied to other types of network topologies in accordance with the disclosure herein. The LAN 100 could also include one or more signal forwarding devices such as a router, repeater, etc.

Each of the computer nodes 105 is centrally connected to a switch 115. The switch 115 includes a plurality of ports 120a–120d (collectively, ports 120). The switch 115 is configured to receive one or more incoming frames through a first port 120 and thereafter transmit each frame through one or more other ports 120 so that the frame reaches its intended destination. The switch 115 includes a search module that examines the destination MAC address of the frame and forwards the frame to the correct port 120, as described in more detail below. The search module is preferably implemented using software instructions that are stored within memory of the switch 115. It will be appreciated that the searching and forwarding functions described herein are not limited to a switch and could be implemented in any network device that implements address searching and frame forwarding logic.

Figure 2:
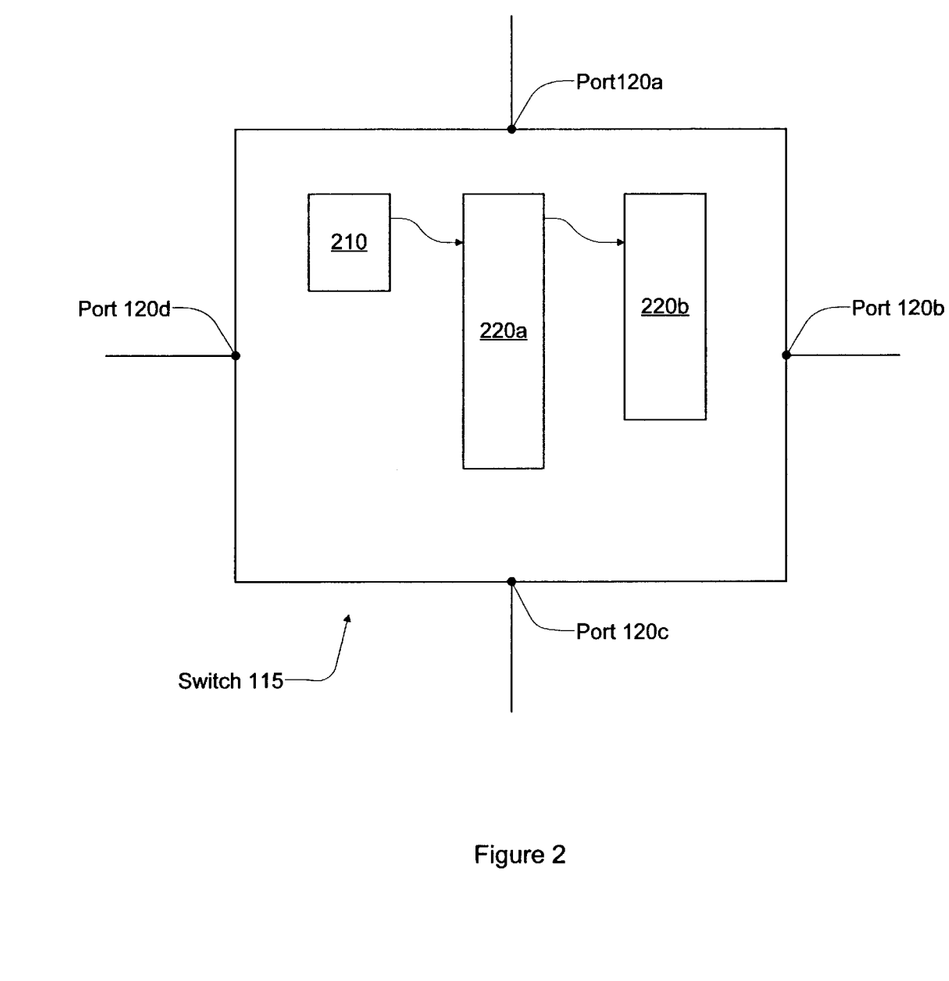
FIG. 2 is a schematic illustration of a switch component of the network system.

FIG. 2 schematically illustrates the switch 115 in which an embodiment of the invention may be implemented. As mentioned, the switch 115 includes a representative plurality of ports 120 that are communicatively coupled to the one or more computer nodes 105 (FIG. 1). Although the switch 115 is shown as having only four ports, it will be appreciated that the number of ports 120 could vary. As mentioned, the switch 115 includes a memory that stores a search module 210 that is configured to examine and process the source and/or destination MAC address of incoming frames and to determine which port(s) 120 the frame should be forwarded to for the frames to reach the intended destination.

With reference to FIG. 2, the switch 115 stores and maintains in memory a primary MAC address table 220a that is used to store MAC addresses and associated port identifiers. The switch 115 also stores and maintains in memory a secondary MAC address table 220b that is linked to and used in conjunction with the primary MAC address table 220a. The secondary MAC address table 220b is also used to store MAC addresses and associated port identifiers. The primary and secondary MAC address tables 220 preferably each have a predetermined format, as described more fully below. The address tables 220 are described herein in the context of storing a MAC address, although it will be appreciated that the tables 220 could be used to store other embodiments of node addresses for a network system.

Figure 3:
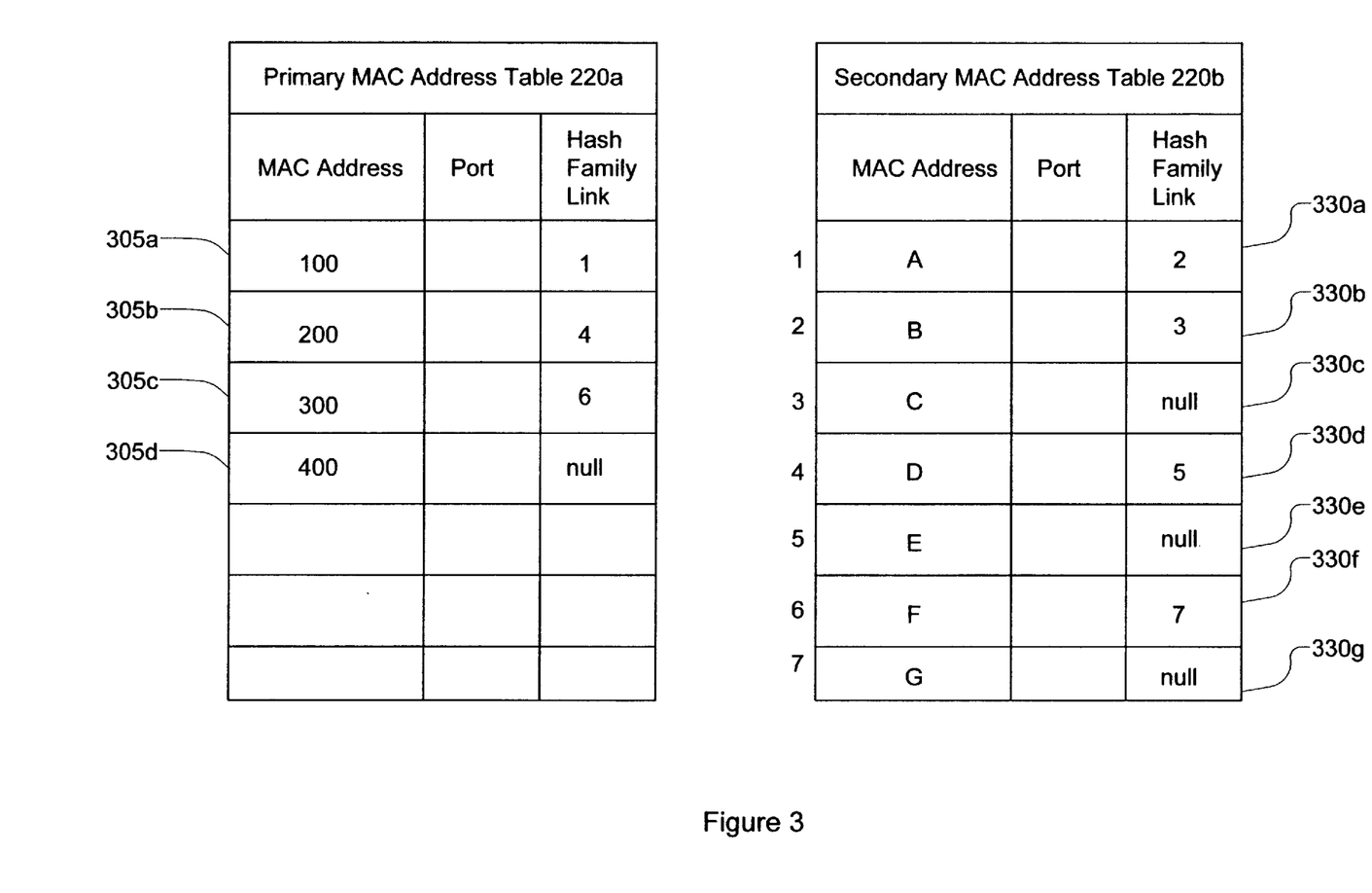
FIG. 3 is an illustration of a preferred embodiment of a primary address table and a secondary address table.

With reference to FIG. 3, there is shown an illustration of a preferred format of the primary MAC address table 220a. The primary MAC address table 220a comprises a data structure that includes a plurality of primary records 305 that are arranged in an array format such that one primary record 305a in the table 220a is followed by a successive record 305b in the table and so on. Each primary record 305 includes an address field for storing a MAC address (either a compressed or a full version), a port field for storing the port identifier with which the MAC address is associated, and a link field for storing a hash family link index that specifies the location of a corresponding secondary record 330 in the secondary MAC address table 220b or to a null link, as described below. Each primary record 305 could also include additional information related to the MAC address.

The primary MAC address table 220a is preferably indexed as a function of the values of the MAC addresses that are stored within the primary MAC address table 220a. In a preferred embodiment, a hashing function is performed on all stored MAC addresses and the hashed value of each MAC address is used as an index for locating the particular primary record 305 in which that MAC address is stored. Thus, the contents of each primary record 305 may be accessed using a primary index that points to the memory location of the particular primary record 305. In such a case, the value of the primary index is equal to the hashed value of the MAC address that is stored within that primary record 305.

It is possible that several different MAC addresses could map to the exact same hash value and, therefore, map to the same primary record 305 in the primary MAC address table 220a. MAC addresses that map to the same value are referred to herein as belonging to the same "hash family." Thus, for example, if MAC addresses 100 and 200 both map to the same hash value, then the addresses 100 and 200 belong to the same hash family. This may result in collisions during indexing of the primary MAC address table 220a, as two different MAC addresses would have the same primary index. The likelihood of collisions occurring is a function of the hash algorithm as well as a function of the amount of compression of the MAC address that occurs during the hash. A greater amount of compression results in less likelihood of collisions than a lesser amount of compression. In one embodiment, the MAC addresses are hashed to a bit width of 16 bits, although the compression width can be any width less than the original width. For a compression to 16 bits, there are 65,536 possible hash families.

Each primary record 305 can be linked to a corresponding secondary record 330 in the secondary MAC address table 220b. If linked, a primary record 305 is preferably linked to a chain of one or more secondary records 330 that store MAC addresses of the same hash family as is stored in the primary record 305. Thus, MAC addresses of the same hash family are stored within the same hash family chain of linked primary and secondary records 305, 330. As used herein, the term "hash family chain" refers to a linked chain of at least one primary record and possibly one or more secondary records, wherein the linked records all store addresses of the same hash family. The memory location of the first secondary record 330 in such a hash family chain is specified in the hash family link field of the primary record 305 in the chain. If the MAC address in a primary record 305 belongs to a hash family chain comprised of only one record, the primary record 305 is preferably linked to a null pointer.

Preferably, the primary MAC address table 220a is sized to store at least as many primary records 305 as there are hash families. In one embodiment, the primary MAC address table 220a is configured to store at least 64k (65,536) primary records 305. The primary MAC address table is preferably stored in a memory that is external to the switch 115. The size or width of each primary record 305 is preferably selected to be less than or equal to the bus width of the external memory.

FIG. 3 also shows a schematic illustration of a preferred format for the Primary MAC address table 220a and sec-ondary MAC address table 220b. The secondary MAC address table 220b comprises a data structure that includes a plurality of secondary records 330 arranged in an array format. Each secondary record 330 includes an address field for storing a MAC address, a port field for storing the port identifier with which the MAC address is associated, and a hash family link field that contains a hash family link that specifies the location of another secondary record 330 that stores a MAC address of the same hash family. In an initial state, the hash family link field contains a null pointer. Additionally, the last secondary record 330 in each hash family chain is preferably linked to a null pointer to indicate the end of the hash family chain.

The secondary MAC address table 220b is preferably located in memory that is internal to the switch 115. The secondary MAC address table 220b is preferably also smaller in size than the primary MAC address table 220a. In one embodiment, the secondary MAAC address table 220b is sized to store 2,048 secondary records 330.

FIG. 3 shows an exemplary embodiment of the primary MAC address table 220a and the secondary MAC address table 220b both being at least partially populated with data. The primary MAC address table 220a is populated with MAC addresses 100, 200, 300, 400 in primary records 305a–305d, respectively. The secondary MAC address table 220b is populated with MAC addresses A, B, C, D, E, F, and G in secondary records 330a–330g, respectively. The index values of the secondary records 330a–330g are 1–7, respectively.

Assume that MAC addresses 100, A, B, and C are of the same hash family; MAC addresses 200, D, and E are of the same hash family; MAC address 300, F and G are of the same hash family; and MAC address 400 is in its own hash family. Therefore, there are four separate hash family chains contained in the exemplary tables 220a and 220b, as shown in FIG. 4.

Figure 4:
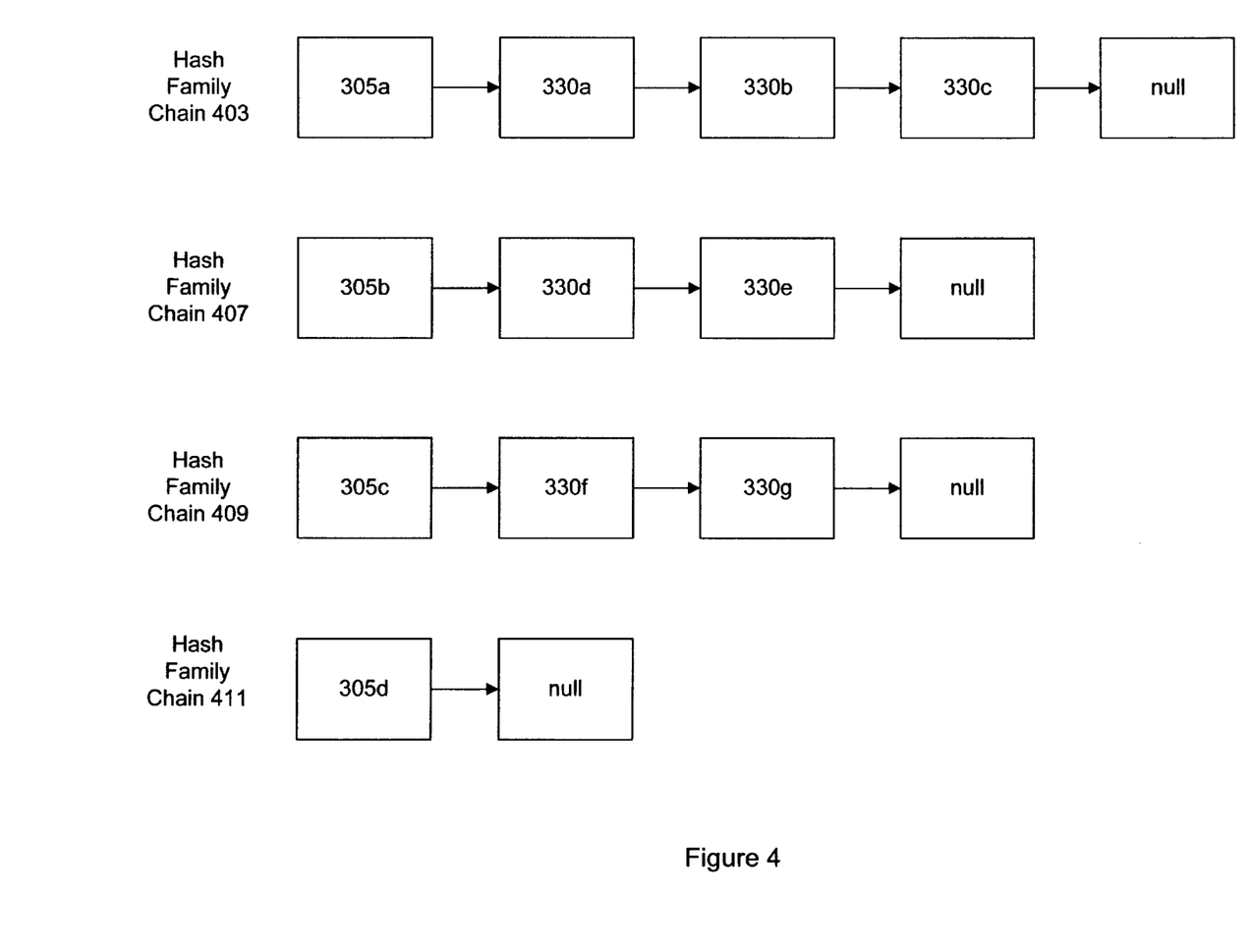
FIG. 4 is an illustration of several hash family chains of address storage records.

With reference to FIG. 4, a first hash family chain 403 is comprised of primary record 305a and secondary records 330a, 330b, and 330c all linked in series. As shown in FIG. 3, the hash family link field in primary record 305a contains the index (1) of secondary record 330a, which is the next record in the chain. Moving forward through the chain, the hash family link field of secondary record 330a contains the index (2) of secondary record 330b. Likewise, the hash family link field of the secondary record 330b contains the index (3) of secondary record 330c, the next (and last) record in the hash family chain. Finally, secondary record 330c contains a null value in its hash family link field, indicating that secondary record 330c is the last record in the hash family chain 403.

Similarly, as shown in FIG. 4, a second hash family chain 407 is comprised of primary record 305b and secondary records 330d and 330e, which are all linked in series. As shown in FIG. 3, the hash family link fields of the primary records 305b and secondary records 330d and 330e each contain the index to the next record in the hash family chain 407. Secondary record 330e, as the last record in the chain, is linked to a null pointer.

As shown in FIG. 4, primary record 305c and secondary records 330f and 330g collectively form yet a third hash family chain 409. Primary record 305d is the sole link in a fourth hash family chain 411 and is linked to a null pointer, as indicated by the null value in its hash family link field (FIG. 3).

Figure 5A:
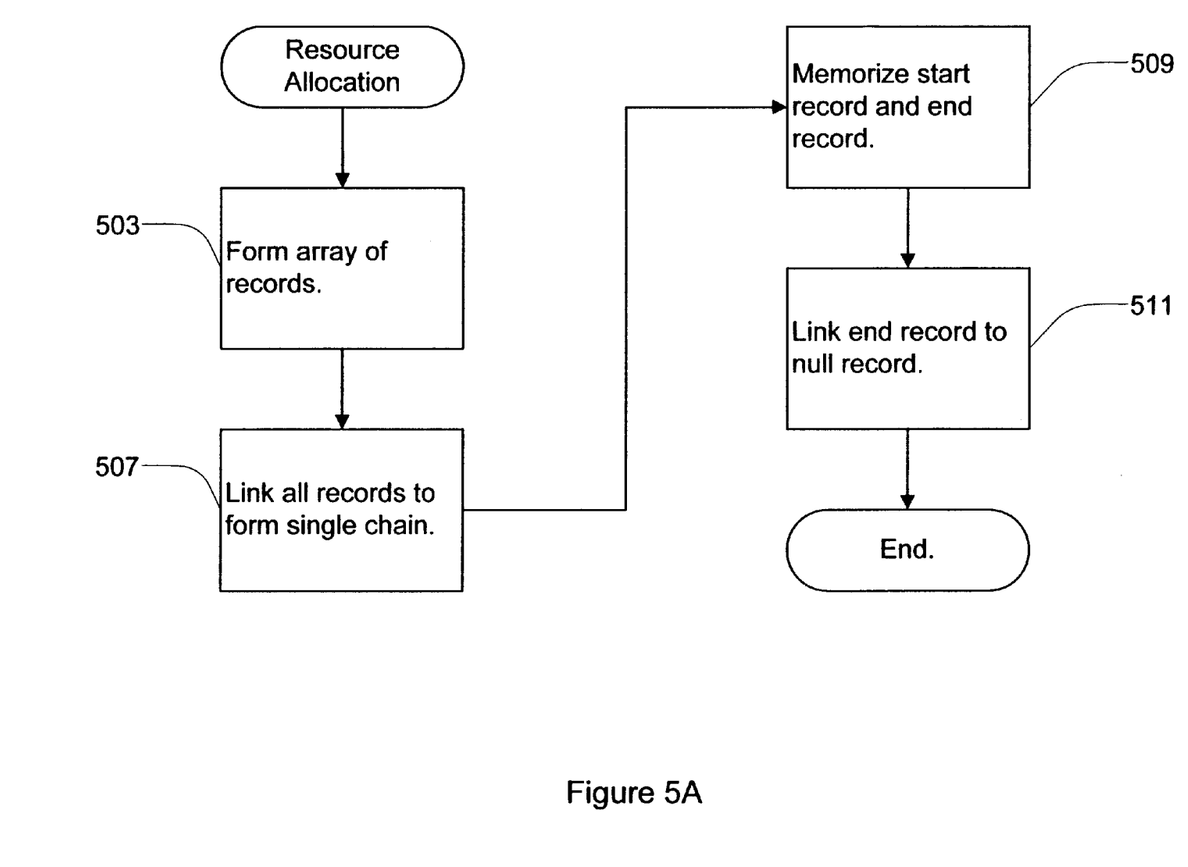
FIG. 5A is a flow chart that describes a process of allocating resources for the secondary address table.

FIG. 5A is a flow chart that describes a process of allocating resources for the secondary MAC address table 220b. In an initial step 503, an array of unpopulated secondary records is formed in internal memory of the switch 115. Preferably, at least one of the records in the array is reserved as a null record. In a preferred embodiment, Ø is used as NULL pointer. Next, in step 507, the secondary records are all linked in series to thereby form a resource allocation chain comprised of all of the secondary records linked in a single chain. The first record in the resource allocation chain is referred to as the start record and the last record in the chain (not including the null record) is referred to as the end record.

In step 509, the switch 115 memorizes the memory address for the start record and the end record of the resource allocation chain. It will be appreciated that addresses of the start record and the end record in the resource allocation chain may change as the secondary MAC address table 220b is populated and maintained. The switch 115 preferably keeps track of such address changes so that the addresses for the start and end records of the resource allocation chain are constantly updated.

In step 511, the end record of the resource allocation chain is linked to the null record. The resource allocation process then ends.

Figure 5B:
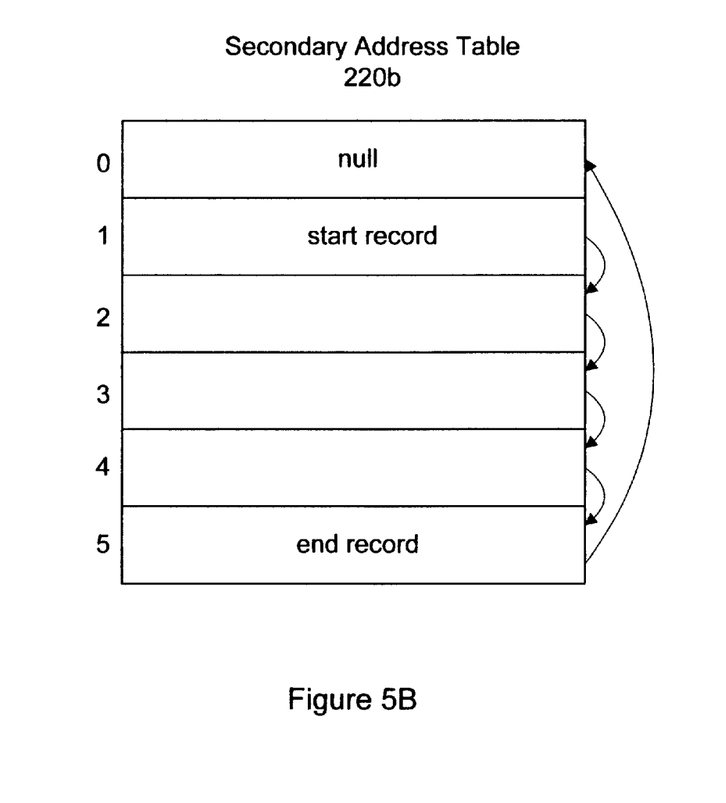
FIG. 5B shows a first example of a secondary address table that has been allocated in accordance with the process of FIG. 5A.

An example of a secondary address table 220b that has been allocated in accordance with the aforementioned resource allocation process is illustrated in FIG. 5B. FIG. 5b shows an exemplary secondary address table 220b having six secondary records designated with indices of 0 through 5. The secondary record with index 0 is reserved as the null record. The start record is the secondary record with index 1 and the end record is the secondary record with index 5 so that the resource allocation chain is comprised of secondary records 1, 2, 3, 4, and 5, linked in that order. The end record is linked to the null record.

Figure 5C:
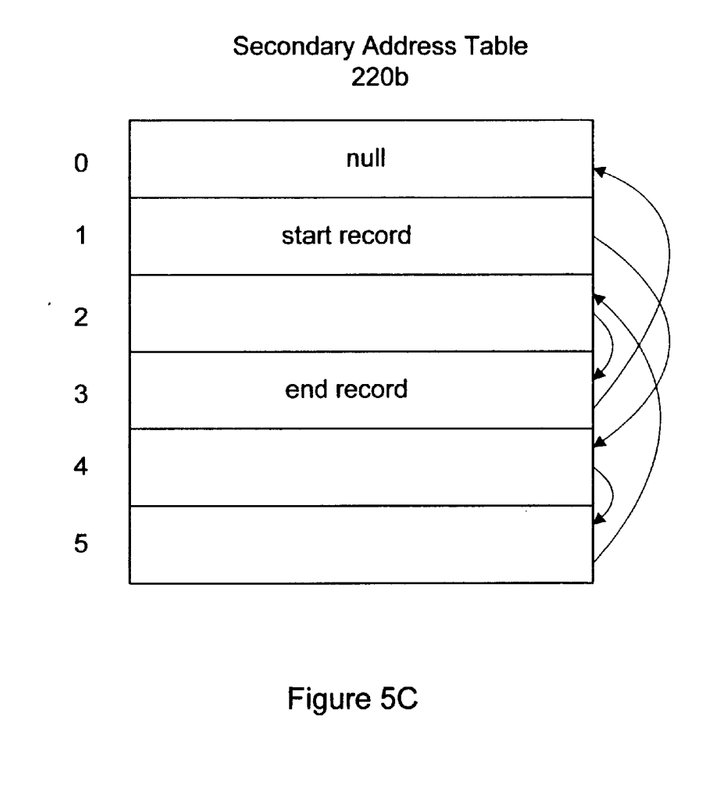
FIG. 5C shows a second example of a secondary address table that has been allocated in accordance with the process of FIG. 5A.

It will be appreciated that the secondary records in the resource allocation chain need not be maintained in consecutive order. For example, FIG. 5C shows the resource allocation chain being comprised of secondary records 1, 4, 5, 2, and 3, lined in that order. In this example, record 1 is the start record and record 3 is the end record.

Figure 6:
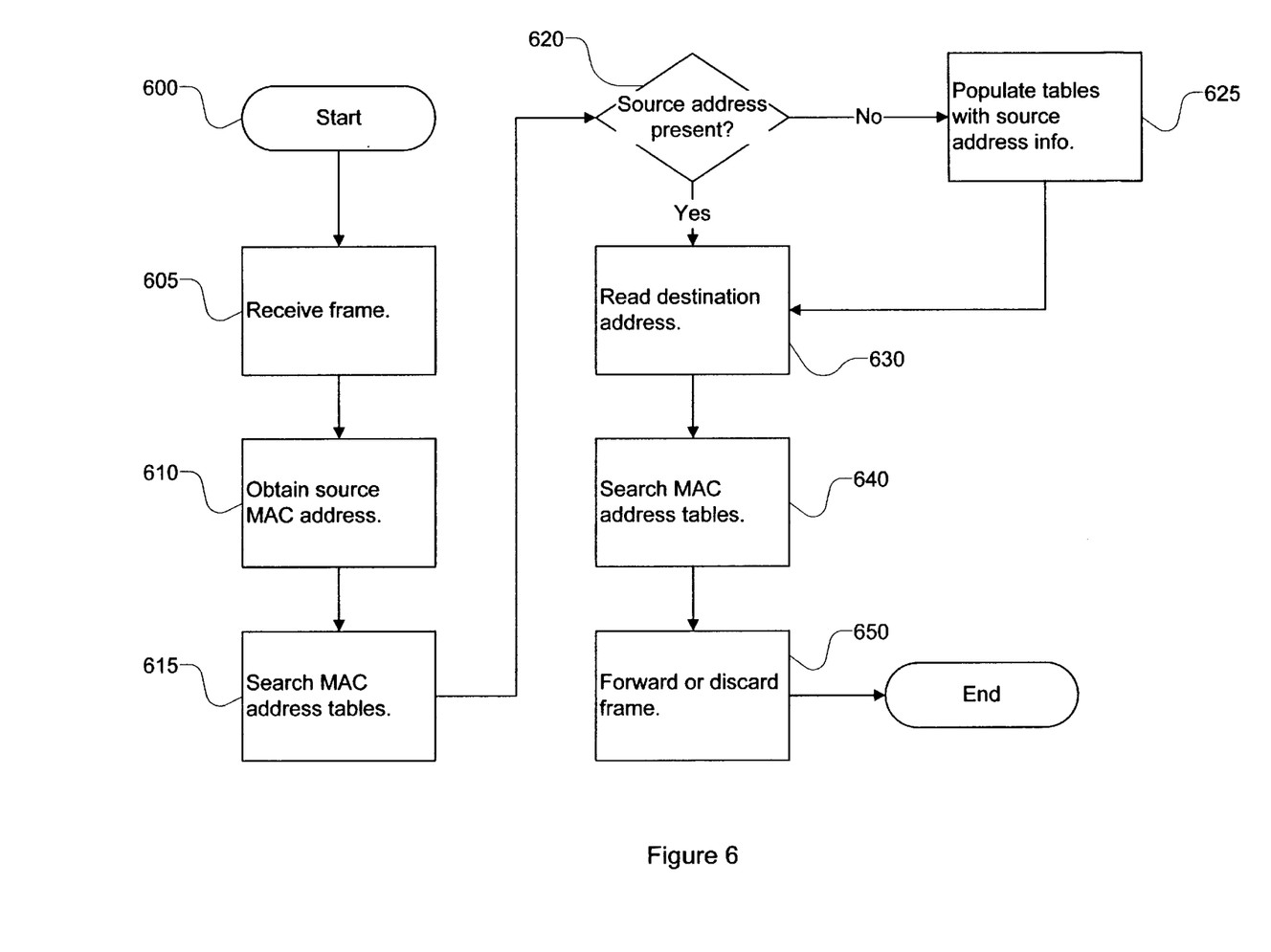
FIG. 6 is a flow chart that describes frame forwarding mechanisms of the switch component.

FIG. 6 is a flow chart that generally describes the frame forwarding mechanism for the switch 115. In the first step 605, the switch 115 receives an incoming frame through a particular port 120. The switch 115 next examines the source address portion of the frame and obtains the MAC address of the node from which the frame originated (step 610).

In step 615, the switch 115 invokes the search module 210 to search the MAC address tables 220 and determine whether the source address is present in the tables (step 620). The source address is first hashed to obtain the primary search index that is used to access a primary record 305 in the primary MAC address table 220a. The searching process is described in more detail with respect to FIGS. 7A–7D.

If the source address is not present in the MAC address tables 220, the tables 220 are populated with information related to the source MAC address (step 625). The information preferably includes: (1) the source address of the frame; (2) the port number corresponding to the source address; and (3) any other relevant information, such as the age of the source address. For example, assume that node 105a (FIG. 1) has a MAC address of 100. If the incoming frame originates from node 105a, the switch 115 would populate the MAC address tables 220 with the MAC address 100 and the port identifier for port 120a. In this manner, the switch "learns" the MAC addresses and corresponding ports.

The reason that a particular source address would not be present in the tables 220 could vary. For example, the switch 115 could be new on the network, the sending device could be new on the network, or the sending device could have been quiet recently (i.e., the sending device has not recently sent a frame).

The switch 15 may use the age entry of the MAC address table as a means of periodically maintaining the size of the MAC address table. For example, if the age of the MAC address entry has exceeded a predetermined time limit, then the switch could remove the entry from the MAC address table. This would conserve memory and also improve access speed because fewer entries need to be examined.

If the search module 210 finds that the source address is indeed present in the MAC address tables 220, the switch 115 then obtains the destination MAC address from the frame (step 630). The switch 115 then invokes the search module 210 to search the MAC address tables 220 (step 635), in accordance with the method described below with respect to FIG. 5. Depending upon whether the destination MAC address is present in the MAC address tables 220, the frame is then forwarded through the appropriate port(s) 120 or discarded in a conventional manner.

For example, if the MAC address is not found in the MAC address tables 220, the switch 115 forwards the frame to all ports to ensure that the frame eventually gets to its recipient. If the destination MAC address is found in the MAC address tables 120, the switch 115 obtains the details of the destination MAC address from the tables 120 including which port that the destination MAC address is associated with. The switch 115 then sends the frame out through the appropriate port 120.

If the port associated with the destination MAC address is the same as the port through which the frame was received, then the switch 115 preferably filters the frame (i.e., discards the frame). The frame is discarded because the source node and the destination node are both located on the same shared segment of the LAN. Thus, the frame would have already been transmitted to the destination address without having to travel through the switch 115.

Figure 7A:
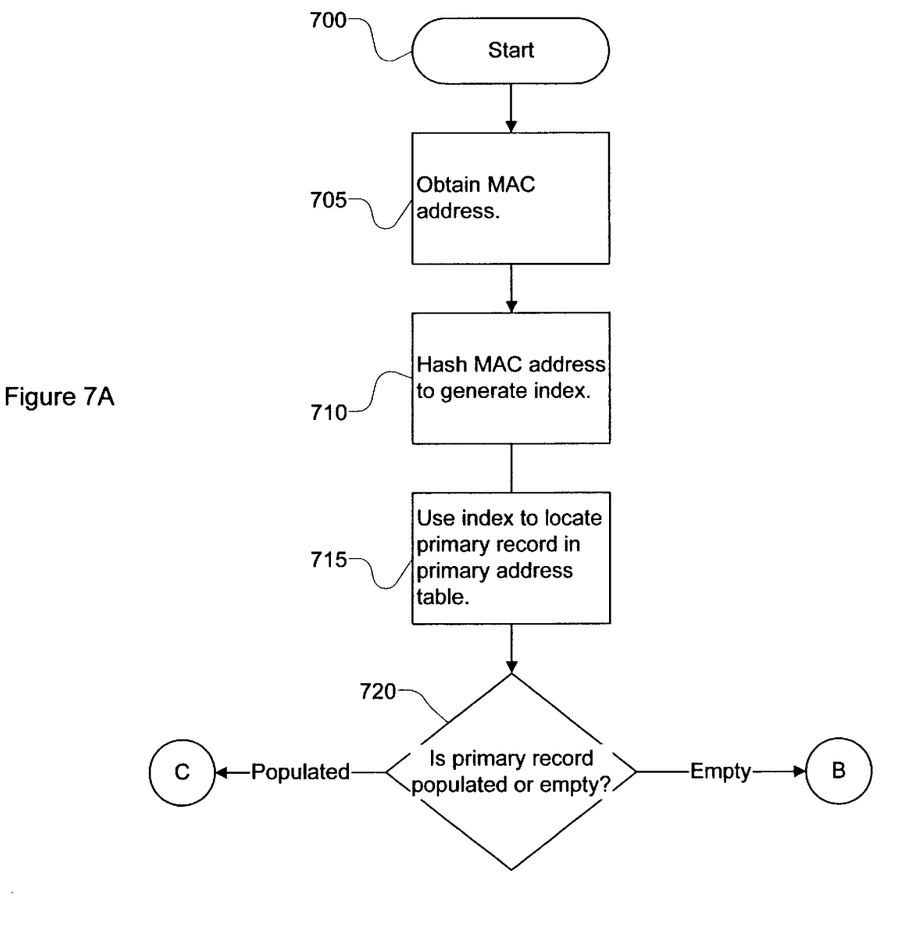
FIGS. 7A–7D are flow charts that describe a method of searching and populating primary and secondary address tables.
Figure 7B:
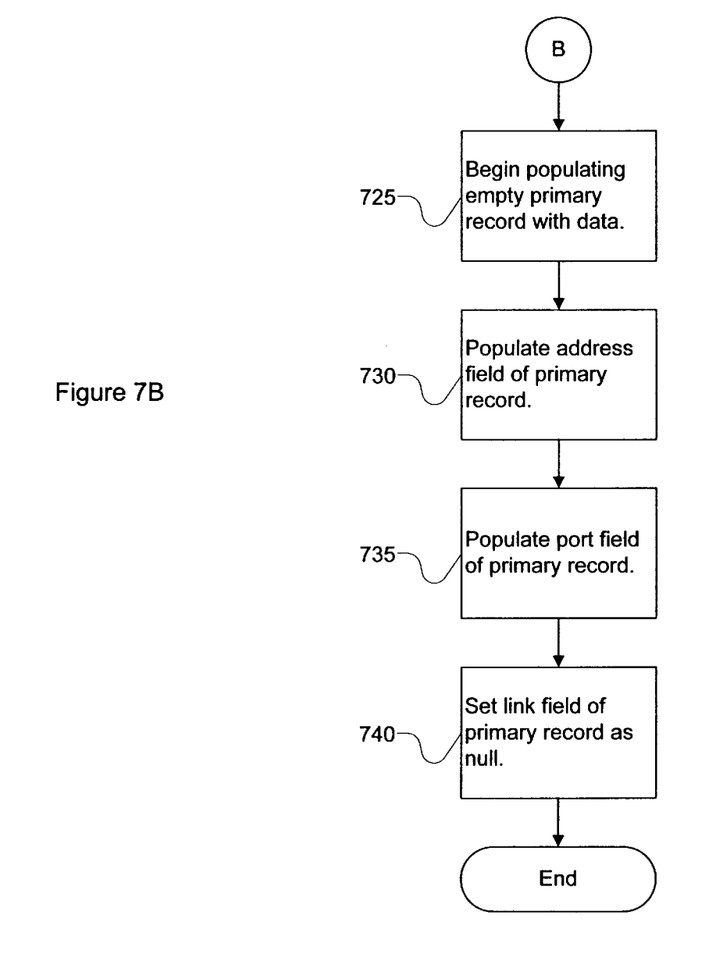
Figure 7C:
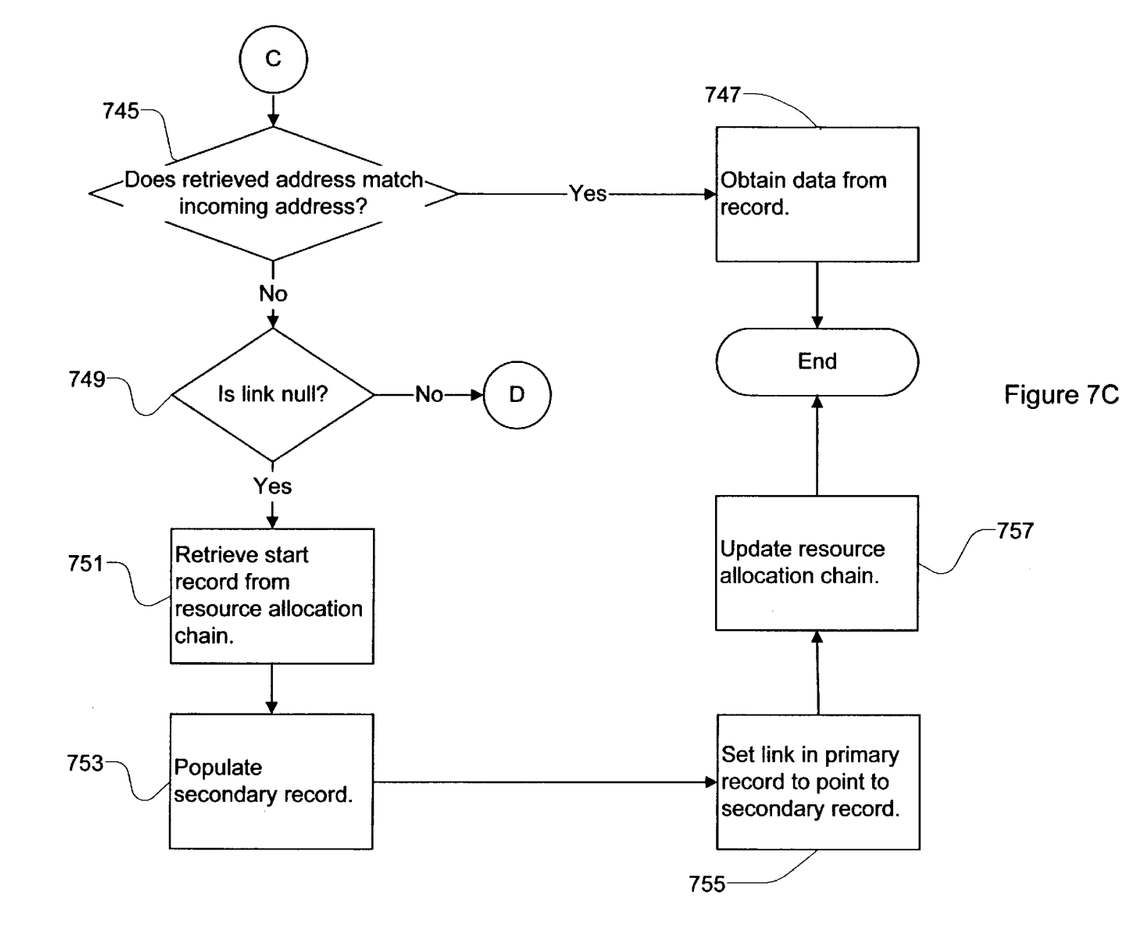

FIGS. 7A–7C show flow charts that describe a process by which search module searches the MAC address tables 220 and also learns MAC address information using the MAC address tables 220. The switch 115 preferably includes hardware and/or software that are configured to implement the described process. With reference to FIG. 7A, in the first step 705, the search module 210 obtains a MAC address (the "incoming address") from a frame. In the context of the Ethernet standard, an exemplary frame includes several fields, including a field for the destination address and the source address of the frame. The search module 210 obtains the MAC address in a well-known manner.

In step 710, the search module 210 hashes the incoming MAC address to generate the primary index. The search module preferably hashes the incoming MAC address to a size smaller than the 48 bit size of a full MAC address. The incoming MAC address may be hashed using a hashing function that uses the value of the incoming MAC address to output a compressed or hashed value.

In step 715, the search module 210 uses the primary index to locate and retrieve a primary record 305 in the primary MAC address table 220a. In other words, the hashed value of the incoming MAC address is used to locate a primary record 305 in the primary MAC address table 220a. For reference purposes, the located primary record will be referred to as primary record 305a.

The search module 210 then examines the primary record 305a and determines whether the primary record 305a is empty or populated with data (step 720). If the primary record 305a is empty, it means that a hash family chain does not yet exist for the incoming MAC address. If this is the case, the search module 210 then proceeds to process B (FIG. 5B), where the search module establishes the first link in a new hash family chain by populating the primary record 305a with information associated with the incoming MAC address.

With reference to FIG. 7B, in step 725, the search module 210 begins populating the primary record 305a with the MAC address data. In step 730, the search module 210 populates the MAC address field (FIG. 3) of the primary record 305a with the incoming MAC address. In step 735, the search module populates the port field (FIG. 3) with an identifier for the port that is associated with the incoming MAC address. In step 740, the search module 210 sets the link field (FIG. 3) in the primary record 305a to a null value, thereby indicating that the primary record 305a is currently the only record in this particular hash family chain. Alternately, the link field could have a default value of null and remain so until changed. In this manner, the search module has established a new hash family chain with the primary record 305a being the first (and only) link in the chain. The process is the complete.

Returning again to step 720 of FIG. 7A, the search module 210 may discover that the primary record 305a is already populated with data. This means that a hash family chain already exists for the incoming MAC address, although the number of links in the chain is unknown. If this is the case, the search module 210 proceeds to process C, which is described in FIG. 7C.

With reference now to FIG. 7C, the illustrated flow chart describes the performance of the search module 210 where the primary record 305a is already populated with data. In step 745, the search module compares the incoming MAC address to the MAC address that is stored in the record (the "retrieved address") and determines whether the addresses are the same. If the incoming address is indeed the same as the retrieved address, then a match has been found. The search module 210 then obtains the data from primary record 305a (step 747) and the process is complete.

However, if the incoming MAC address does not match the retrieved address, then a collision has occurred and the process proceeds to step 749. This means that two different MAC addresses have hashed to the same primary index value. In other words, two different MAC addresses of the same hash family are mapped to primary record 305a. In step 749, the search module examines the link field of the primary record 305a and determines whether the link field has a null value.

If the link field indeed contains a null value, then it means that the primary record 305a is currently the only record in the hash family chain for that record and the search module 210 should proceed to establish a new record in the hash family chain. The new record in the chain will store the incoming MAC address.

The process then proceeds to step 751, where the search module 210 uses the resource allocation chain (discussed above with respect to FIGS. 5A–5C) of the secondary address table 220b to retrieve a secondary record for storing the incoming MAC address and appending to the hash family chain. The secondary record that is retrieved is referred to herein as a "retrieved secondary record." The search module 210 preferably uses the start record in the resource allocation chain as the retrieved secondary record.

In step 753, the search module 210 populates the address field and the port field of the retrieved secondary record with the appropriate information related to the incoming MAC address. The search module 210 also populates the hash family link field with a null value thereby indicating that the retrieved secondary record is now the last link in the hash family chain.

Next, in step 755, the search module sets the hash family link field of the primary record 305a to the point to the location of the retrieved secondary record. In this manner, the primary record 305a and the retrieved secondary record are linked as two records in the same hash family chain.

In step 757, the search module updates the resource allocation chain to reflect that the retrieved secondary record has been populated with new data. Additionally, the next consecutive secondary record (FIG. 5B, 2) in the resource allocation chain after the retrieved secondary record is designated as the new start secondary record. The process is then complete.

Returning again to step 749 of FIG. 7C, the search module 210 may discover that the primary record 305a does not contain a null value for its hash family link but rather contains a pointer to a secondary record. This means that the primary record 305a is already linked to one or more secondary records in a hash family chain. If so, the search module 210 then proceeds to process D, which is described with respect to FIG. 7D.

Figure 7D:
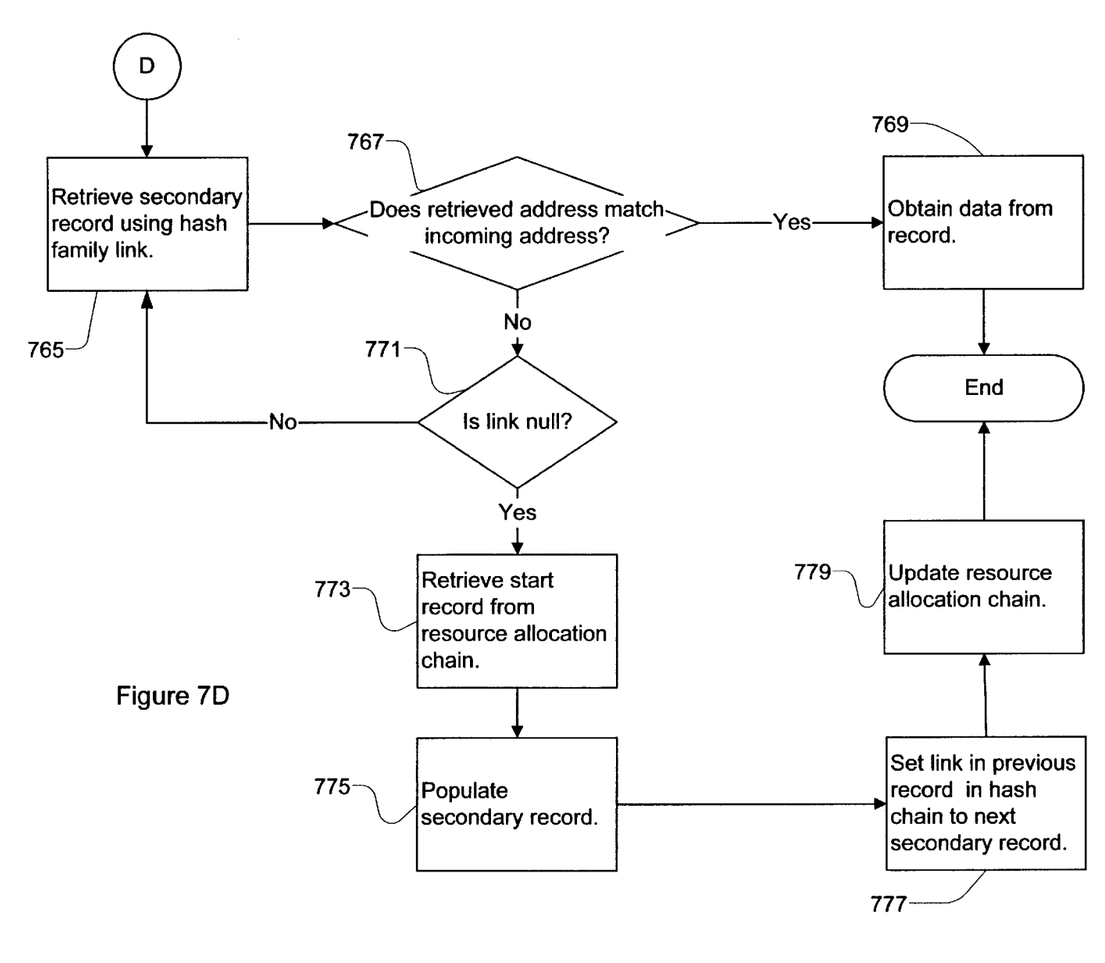

Referring now to FIG. 7D, in step 765 the search module retrieves a secondary record (the "retrieved secondary record") using the hash family link that is contained in the primary record 305a. The retrieved secondary record is the next record in the hash family chain for the incoming MAC address. The search module 210 then retrieves the MAC address contained in the retrieved secondary record. In step 767, the search module determines whether the retrieved address matches the incoming address. If the incoming address is indeed the same as the retrieved address, then a match has been found. The search module 210 then obtains the data from the retrieved secondary record (step 769) and the process is complete.

However, if the retrieved address does not match the incoming address, then the process proceeds to step 771. In step 771, the search module examines the hash family link field of the retrieved secondary record and determines whether the link field has a null value. If the link field does not contains a null value, then it means that additional secondary records are linked to the current hash family chain. If this is the case, the search module uses the hash family link that is specified in the hash family link field to retrieve the next secondary record in the hash family chain (step 765). The search module loops through steps 765, 767, and 771 until either a match is found in step 767 or a null link is found in step 771.

Returning to step 771, if the hash family link field does indeed contain a null value, then it means that the retrieved secondary record is the last record in the hash family chain. Therefore, the search module 210 should proceed to append yet another record to the end of the hash family chain for storing the incoming MAC address.

The process then proceeds to step 773, where the search module 210 uses the resource allocation chain of the secondary address table 220b to retrieve a new secondary record for appending to the hash family chain. The search module 210 preferably uses the start record in the resource allocation chain as the new secondary record.

In step 775, the search module 210 populates the address field and the port field of the new secondary record with the appropriate information related to the incoming MAC address. The search module 210 also populates the hash family link field with a null value thereby indicating that the retrieved secondary record is now the last link in the hash family chain.

Next, in step 777, the search module 210 sets the hash family link field of the previous secondary record in the hash family chain (the one with null pointer) to point to the location of the new secondary record that now stores the incoming MAC address. In this manner, the hash family chain has been extended by an additional record.

In step 779, the search module 210 updates the resource allocation chain to reflect that the retrieved secondary record has been populated with new data. Additionally, the next consecutive secondary record in the resource allocation chain after the retrieved secondary record is designated as the new start secondary record. The process is then complete.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of searching for a computer address in an address table, the computer address having a bit size n, the method comprising:
   a. generating a search index by compressing the computer address to obtain a compressed value of the address, wherein the search index comprises a first number of bits less than the bit size n;
   b. accessing a primary address record corresponding to the computer address in a primary address table, the primary address record being accessed by using the search index to locate the primary address record, wherein the primary address record includes the computer address, a port number associated with the computer address, and a link that that specifies the location of an initial secondary address record in a secondary address table;
   c. comparing the search index to the primary address record by:
      i. decompressing the search index to obtain a first value;
      ii. decompressing the compressed value of the address contained in the primary address record to obtain a second value;
      iii. comparing the first value to the second value;
   d. if the first value does not equal the second value, then accessing the initial secondary address record using the link, wherein the initial secondary address record includes a full computer address, a port number associated with the full computer address, and a link to a subsequent secondary address record of the same hash family.

2. The method of claim 1, wherein the primary address table is stored in a memory external to the switch.

3. The method of claim 1, wherein generating a search index by compressing the computer address comprises compressing the computer address from a width of 48 bits to a width of less than 48 bits.

4. The method of claim 1, wherein generating a search index by compressing the computer address comprises compressing the computer address from a width of 48 bits to a width of 16 bits.

5. The method of claim 1, additionally comprising comparing the first value to the full computer address in the secondary record.

6. The method of claim 5, additionally comprising, if the subsequent secondary record is empty, populating the subsequent secondary record with the computer address and with a port associated with the computer address.

7. The method of claim 6, additionally comprising, if the subsequent secondary record is empty, populating the initial secondary address record with the location of the subsequent secondary address record.

8. A storage and search unit for computer addresses each having a fixed bit size n, comprising:
   a. a primary address table stored within a first memory of a first bus width, the primary address table configured to store a plurality of primary address records, each primary address record including a respective address entry of a first bit size less than the fixed bit size n, a port number associated with the compressed address entry and a first link that links each primary address record to a corresponding chain of secondary address records in a second address table;
   b. a secondary address table stored within a second memory separate from the first memory, the second address table configured to store a plurality of secondary address records, each secondary address record including a full address entry of a second bit size equal to the fixed bit size n, a port number associated with the computer address, and a link that links each secondary address record to a corresponding secondary address record in the second address table to thereby form one or more linked chains of secondary address records, wherein each chain of secondary address records contains full address entries of the same hash family;
   c. a software search module configured to store and access the primary address records and secondary address records, wherein the software module stores each primary address record in a location defined by the value of the respective compressed address entry.

9. The storage and search unit of claim 8, wherein the computer addresses comprise MAC addresses.

10. The storage and search unit of claim 8, wherein the bus width of the first memory is 16 bits.

11. The storage and search unit of claim 8, wherein the bit size of the compressed address entry is equal to the bus width of the first memory.

12. The storage and search unit of claim 8, wherein the storage and search unit comprises a switch on an Ethernet network.

13. The storage and search unit of claim 12, wherein the first memory is external to the switch.

14. The storage and search unit of claim 13, wherein the second memory is internal to the switch.

15. Computer readable software stored within a frame forwarding device of a computer network, the computer readable software code including a set instructions for causing the device to search for a computer address in an address table, the computer address having a bit size n, the instruction further causing the device to:
   a. generate a search index by compressing the computer address to obtain a compressed value of the address, wherein the search index comprises a first number of bits less than the bit size n;
   b. access a primary address record corresponding to the computer address in a primary address table, the primary address record being accessed by using the search index to locate the primary address record, wherein the primary address record includes the compressed value of the address, a port number associated with the computer address, and a link that links the primary address record to an initial secondary address record in a secondary address table;

c. compare the search index to the primary address record by:
   i. decompressing the search index to obtain a first value;
   ii. decompressing the compressed value of the address contained in the primary address record to obtain a second value;
   iii. comparing the first value to the second value;
d. if the first value does not equal the second value, then access the initial secondary address record using the link, wherein the initial secondary address record includes a full computer address, a port number associated with the full computer address, and a link to a subsequent secondary address record of the same hash family.

16. The computer readable software code of claim 15, wherein the primary address table is stored in a memory external to the switch.

17. The computer readable software code of claim 15, further including instructions for causing the device to compress the computer address from a width of 48 bits to a width of less than 48 bits.

18. The computer readable software code of claim 15, further including instructions for causing the device to compress the computer address from a width of 48 bits to a width of 16 bits.

19. The computer readable software code of claim 15, further including instructions for causing the device to compare the first value to the full computer address in the secondary record.

20. The computer readable software code of claim 19, further including instructions for causing the device to, if the subsequent secondary record is empty, populate the subsequent secondary record with the computer address and with a port associated with the computer address.

21. The computer readable software code of claim 20, further including instructions for causing the device to, if the subsequent secondary record is empty, populate the initial secondary address record with the location of the subsequent secondary address record.

* * * * *